US006938497B2

(12) United States Patent
Arscott

(10) Patent No.: US 6,938,497 B2
(45) Date of Patent: Sep. 6, 2005

(54) ACOUSTIC FLOW METER IN THE FORM OF A VALVE KEY

(75) Inventor: Arthur Arscott, Exeter (GB)

(73) Assignee: RPS Water Services Limited (GB)

( * ) Notice: Subject to any disclaimer, the term of this patent is extended or adjusted under 35 U.S.C. 154(b) by 0 days.

(21) Appl. No.: 10/494,198

(22) PCT Filed: Nov. 1, 2002

(86) PCT No.: PCT/GB02/04971

§ 371 (c)(1),
(2), (4) Date: Apr. 29, 2004

(87) PCT Pub. No.: WO03/040664

PCT Pub. Date: May 15, 2003

(65) Prior Publication Data

US 2004/0261538 A1 Dec. 30, 2004

(30) Foreign Application Priority Data

Nov. 3, 2001 (GB) ............................................ 0126453

(51) Int. Cl.[7] ............................ G01F 1/32; E21B 74/10

(52) U.S. Cl. ................................. 73/861.23; 73/152.18

(58) Field of Search ......................... 73/861.23, 861.25, 73/861.26, 152.01, 152.16, 152.18, 152.21, 152.29, 152.32, 152.45, 152.47

(56) References Cited

U.S. PATENT DOCUMENTS 2,073,107 A * 3/1937 Johnston ..................... 166/150
3,800,277 A * 3/1974 Patton et al. ............ 73/152.21
5,113,379 A * 5/1992 Scherbatskoy ............... 367/83
5,592,438 A * 1/1997 Rorden et al. ................ 367/83

* cited by examiner

*Primary Examiner*—Harshad Patel
*Assistant Examiner*—T Miller
(74) *Attorney, Agent, or Firm*—Ira S. Dorman

(57) ABSTRACT

An acoustic flow meter in the form of a valve key has an acoustic sensor 12 for measuring the peak sound level which occurs when the key is used to close a valve in a fluid pipeline. The peak sound level can be used to accurately calculate the flow through the valve and provide the flow information on a display unit 11. Parameters for the upstream supply pressure, pipe diameter and valve characteristics can be entered to ensure the accuracy of the flow calculations. The key therefore provides a way of determining fluid flow in a pipeline to a reasonable level of accuracy without having to install in-line flow meters.

10 Claims, 3 Drawing Sheets

ACOUSTIC FLOW METER IN THE FORM OF A VALVE KEY

TECHNICAL FIELD OF THE INVENTION

This invention relates to an acoustic sluice valve flow meter in the form of a valve key.

BACKGROUND

When monitoring for leaks in a water supply network it is common to monitor the flow at a convenient point in the network during off-peak periods, e.g. at night, when water consumption is likely to be low or non-existent. The amount of leakage in the system can then be calculated by subtracting the anticipated usage from the measured flow.

Orifice meters are commonly used to measure flow in pipes. These work on the principle of causing water to flow through a restriction in a pipeline which results in a reduction in pressure. The flow of water can be accurately calculated from the measured pressure reduction taking into account the physical characteristics of the pipe and the restriction.

Since a flow meter must be physically connected into the pipeline it is not always possible to measure flow at any desired position in a supply network. Furthermore, the installation of flow meters at all points where flow is likely to be measured would be prohibitively expensive.

A technique commonly used for pinpointing leaks in water pipelines is to detect the noise generated by the leaking water. This can be done manually by ear using sounding sticks or ground microphones. The loudness of the sound is related to the rate of flow and the proximity of the leak. However, such a technique is only suitable for locating leaks within a relatively small area and cannot be used to provide a quantitative measurement of leakage within a large supply network.

The present invention seeks to provide a new and inventive way of providing a reasonably accurate measurement of flow at positions in a supply network where there is no flow meter installed.

SUMMARY OF THE INVENTION

The present invention proposes an acoustic flow meter including a shaft which, when in a vertical position, has a valve-operating head at its lower end for engagement with a flow control valve and a rotation handle at its upper end, and an acoustic sensor for converting sounds produced by the flow of fluid through the valve into electrical output signal which varies with flow.

The invention also provides a method of measuring flow through a fluid supply pipeline provided with a valve, which includes:

- providing an acoustic sensor to sense the level of sound produced by fluid flowing through the pipeline in the vicinity of the valve;
- progressively closing the valve to measure the peak sound level produced during closure of the valve; and
- using said measured peak sound level to determine the magnitude of flow through the pipeline.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
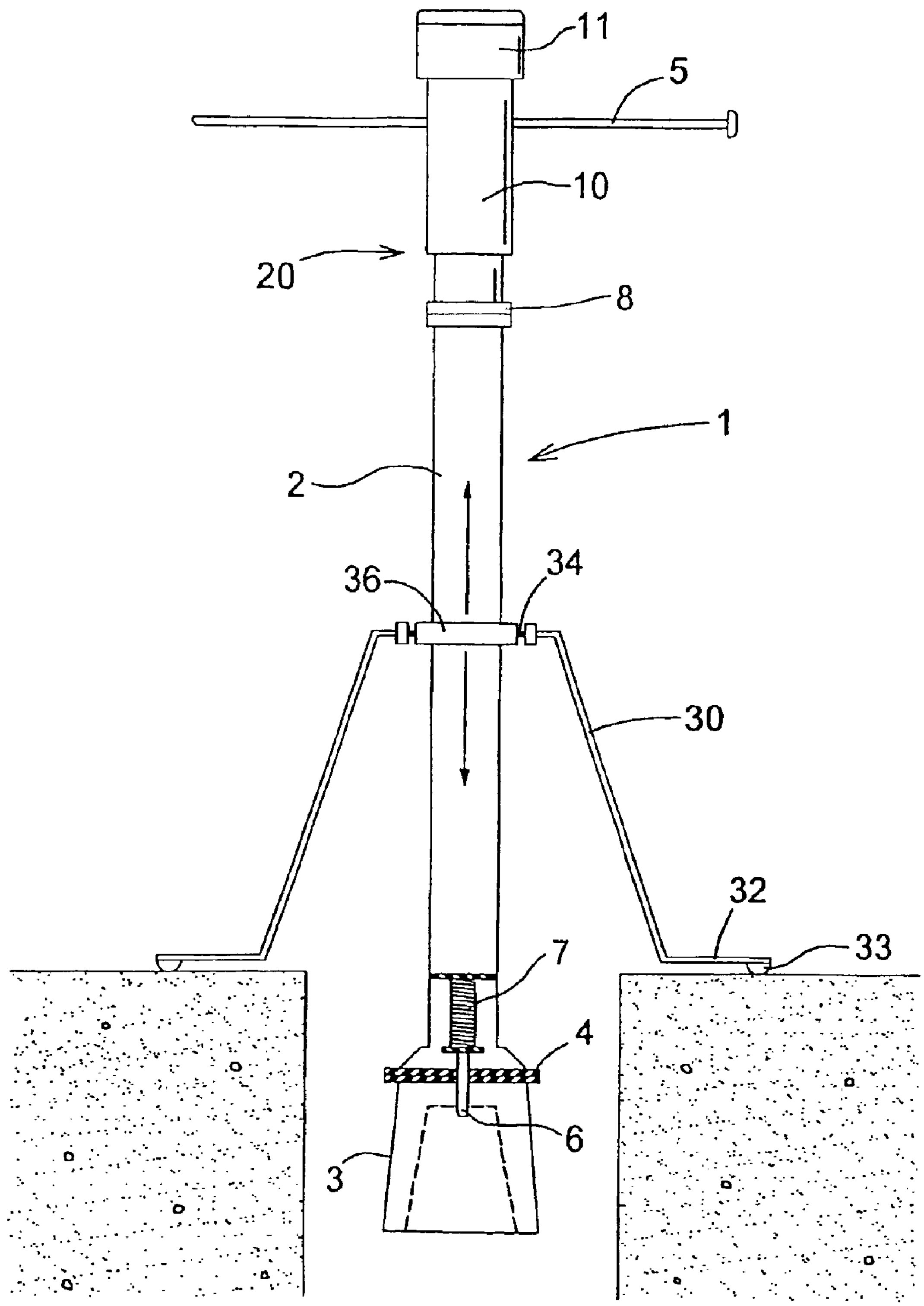
FIG. 1 is a general side view of an acoustic sluice valve flow meter in accordance with the invention.

Referring to FIG. 1, an acoustic sluice valve flow meter in the form of a valve operating key 1 includes an elongate metal shaft 2 which is shown in an upright position in which it is normally used. At the bottom end of the shaft there is a valve-operating head 3 which is attached by means of a quick-release coupling 4 so that different heads can easily be fitted for operating different kinds of water flow-control valve, e.g. sluice valves, stopcocks and the like. In general, the head 3 may be a hollow shell which is open at the lower end, shaped to fit over and engage the operating member of a suitable valve (not shown). At the top end of the shaft 2 there is a transversely-projecting turning bar 5 by which the key may be manually rotated about the axis of the shaft in order to operate the valve.

An acoustic coupling element 6 is mounted generally co-axially within the shaft 2 to project into the head 3. The coupling element is resiliently biassed by means of a spring 7 in order to ensure firm contact pressure with the valve and thereby provide a good acoustic connection. The element 6 is mechanically coupled through the shaft 2 via a water-tight acoustic coupling 8 to a remotely-located electromechanical acoustic sensor indicated at 20. By locating the sensor at the upper end of the shaft 2 the sensor may be protected from physical damage or contamination with water or other substances which may adversely affect its operation. The sensor may be acoustically insulated to reduce pickup of unwanted external noises.

Figure 2:
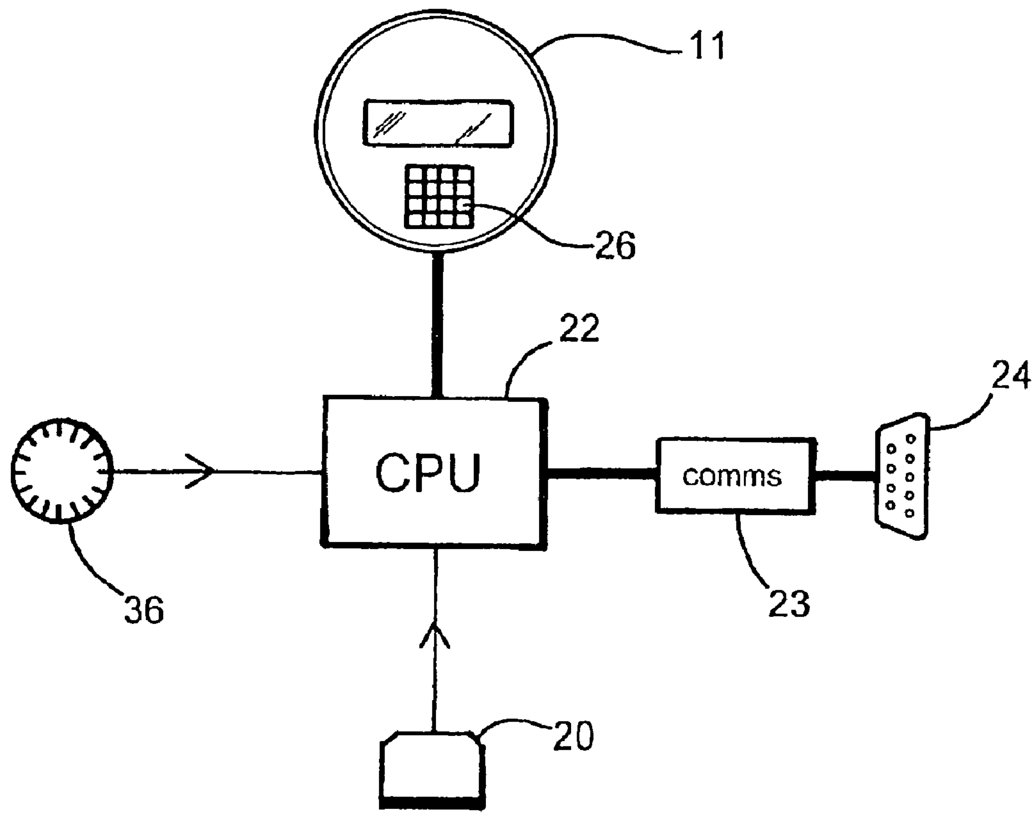
FIG. 2 is a block circuit diagram of the electronic components of the flow meter.

Referring to FIG. 2, the sensor 20 operates in the manner of a microphone to convert sounds into electrical signals. The signals may represent the amplitude of sounds received through the coupling element 6 in a simple analogue form or in an encoded form using pulse width modulation, digital encoding etc. The electrical signals from the sensor travel to an electronic processing unit 22 mounted within a water-tight housing 10 (FIG. 1) at the top of the shaft 2. The processing unit 22 is connected with a display unit 11 mounted on top of the housing to indicate the flow through the valve, e.g. by means of a digital display, meter, bargraph or the like. In addition, the processing unit is provided with a communications interface 23 and an external communications port 24 to exchange data with a remote monitoring point, e.g. by means of an RS232 or similar serial communication link, or by radio signals, infra red etc. A keypad 26 or similar input device may be provided on the display unit 11 to allow information to be manually input into the processing unit 22 when required.

In order to reduce the pickup of external noises a flexible boot 30 is slidably mounted on the shaft 2, as shown in FIG. 1. The boot is of part-conical shape with an outwardly projecting flange 32 at its lower end having a flexible sealing bead 33 on its undersurface. The boot can thus be moved along the shaft to rest on the ground while the head 3 is engaged with the valve. The boot may be coupled to the shaft via a flexible joint 34 allowing the boot to seat on uneven ground. A rotation gauge 36 can be used to couple the boot to the shaft to permit accurate measurement of the angle through which the shaft has been rotated relative to the boot which is held stationary by contact with the ground. The gauge allows accurate setting of the amount by which the valve is opened. The gauge can provide a manual reading and/or electronic data for use by the processor 22.

Figure 3:
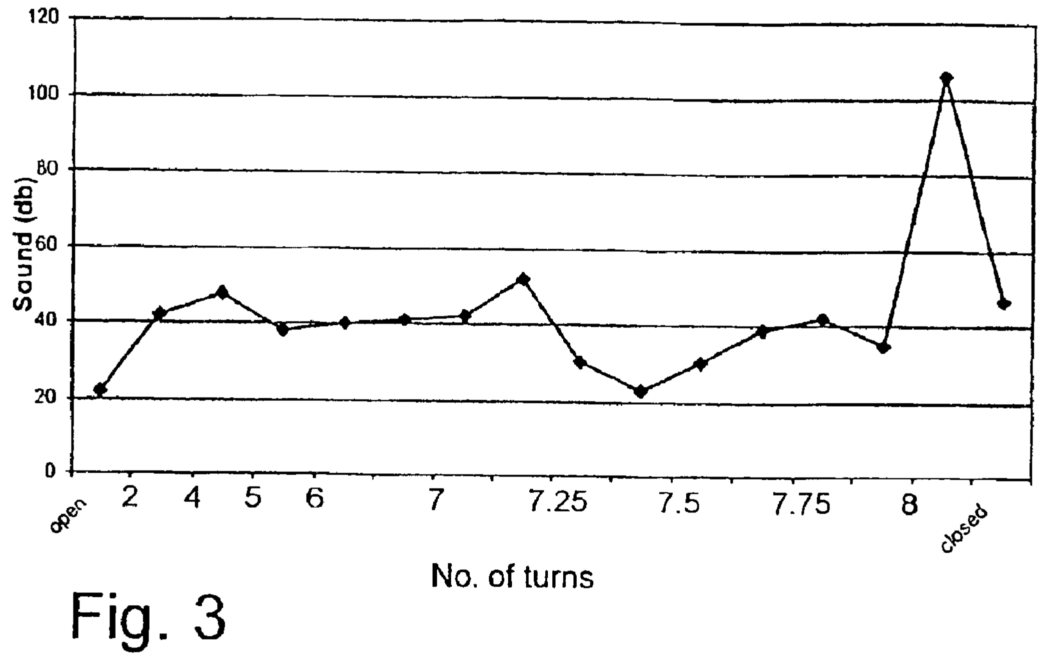
FIG. 3 is a graph showing the variation in an acoustic output signal which is obtained when a valve is closed using the flow meter.

FIG. 3 shows the variation in sound level as detected by the sensor 20 when the key is used to progressively close a typical gate valve. The graph clearly shows that the sound level reaches a distinct peak just before the valve is fully closed. By measuring the peak sound level as the valve passes through the maximum it is possible to calculate the flow through the pipeline using the formula:

$$Q=a\ P^bS^c$$

where Q is the flow, P is the upstream supply pressure, S is the peak sound level and a, b and c are constants determined by the pipe diameter, the physical characteristics of the valve etc. Since the upstream pressure will usually be known it is therefore possible for the processing unit to accurately calculate the flow from the measured peak sound level.

Figure 4:
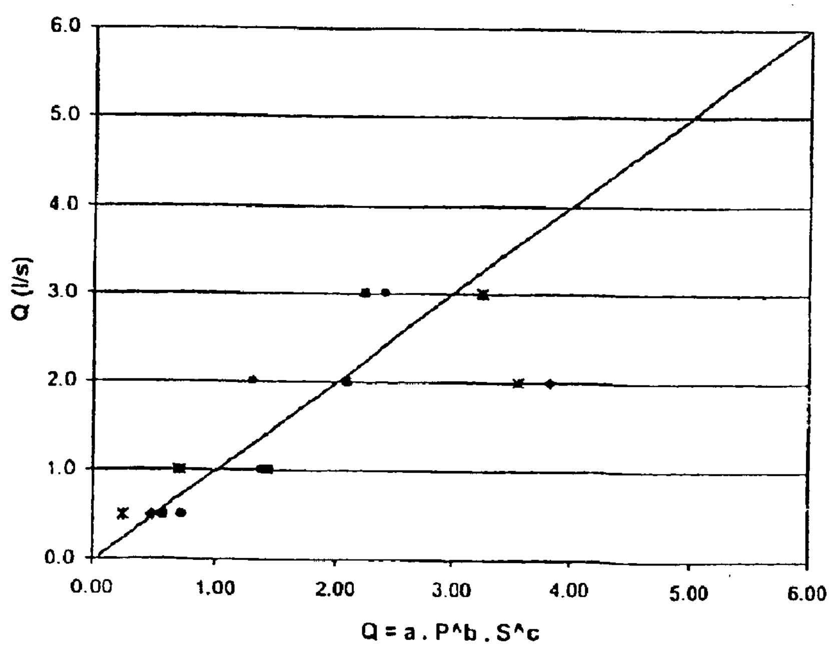
FIG. 4 is a graph relating the true flow values to the values calculated using the flow meter with various kinds of valve.

It has been found that this method of calculating the flow is surprisingly accurate. FIG. 4 shows the how the actual flow measured using accurate flow measurement equipment is related to the flow measured by means of the present invention using a number of different kinds of valve. In most cases an accuracy to within 10 per cent is possible, which although not as accurate as calibrated orifice meters is sufficient for many purposes.

The level of accuracy can be maximised by manually entering accurate figures for the upstream supply pressure, the diameter of the pipeline and the characteristics of the valve. Users can conveniently be provided with a choice of known valve types from which to select, which automatically enters the appropriate valve parameters. Additional data from the rotation gauge 36 can also be used to ensure that the flow calculation is accurate.

The key thus provides a convenient and simple method of measuring flow to a reasonable level of accuracy without the inconvenience and expense of installing in-line flow meters.

Although the key is intended for use with water control valves it could also be used with valves for controlling the flow of other fluids.

It will be appreciated that the features disclosed herein may be present in any feasible combination. Whilst the above description lays emphasis on those areas which, in combination, are believed to be new, protection is claimed for any inventive combination of the features disclosed herein.

What is claimed is:

1. An acoustic flow meter including a shaft which, when in a vertical position, has a valve-operating head at its lower end for engagement with a rotary flow control valve and a rotation handle at its upper end by which the shaft can be manually rotated to progressively close a rotary flow control valve engaged by the valve-operating head, and an acoustic sensor for converting sounds produced by the flow of fluid through the valve into electrical output signal which varies with flow.

2. An acoustic flow meter according to claim 1 in which the valve operating head includes a resiliently-biassed acoustic coupling element for engagement with the valve.

3. An acoustic flow meter according to claim 1 which includes a processing unit which uses said electrical output signal to produce a calculated value for the flow through the valve.

4. An acoustic flow meter according to claim 3 which includes a visual display unit for displaying said calculated value.

5. An acoustic flow meter according to claim 3 which includes an electronic communications port through which the processing unit can transfer data with external equipment.

6. An acoustic flow meter according to claim 1 which includes a boot located about the shaft for contact with a surface surrounding a hole in which the valve is located.

7. An acoustic flow meter according to claim 6 in which the boot is rotatably mounted relative to the shaft.

8. An acoustic flow meter according to claim 7 which includes a rotation gauge for providing an indication of the relative rotation between the boot and the shaft.

9. A method of measuring flow through a fluid supply pipeline provided with a rotary valve, which includes:

providing an acoustic sensor to sense the level of sound produced by fluid flowing through the pipeline in the vicinity of the valve;

progressively closing the valve to measure the peak sound level produced during closure of the valve; and using said measured peak sound level to determine the magnitude of flow through the pipeline.

10. A method according to claim 9, in which the magnitude of the flow through the pipeline is calculated by means of a processing unit taking into account at least one of:

the upstream fluid supply pressure in the pipeline;

the characteristics of the valve; and the diameter of the pipeline.

* * * * *